United States Patent
Papendorf et al.

(10) Patent No.: US 6,739,645 B2
(45) Date of Patent: May 25, 2004

(54) HARDTOP VEHICLE ROOF WITH THREE RIGID ROOF PARTS

(75) Inventors: Marcus Papendorf, Besigheim (DE); Gerald Hahn, Hamburg (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/445,575

(22) Filed: May 27, 2003

(65) Prior Publication Data

US 2003/0197397 A1 Oct. 23, 2003

Related U.S. Application Data

(63) Continuation-in-part of application No. PCT/EP02/11208, filed on Oct. 7, 2002.

(30) Foreign Application Priority Data

Oct. 8, 2001 (DE) .......................................... 101 49 456

(51) Int. Cl.$^7$ .................................................. B60J 7/14
(52) U.S. Cl. ............. 296/108; 296/107.08; 296/107.17; 296/136.06
(58) Field of Search ........................... 296/108, 107.07, 296/107.08, 107.09, 107.16, 107.17, 136.01, 136.05, 136.06

(56) References Cited

U.S. PATENT DOCUMENTS 5,769,483 A * 6/1998 Danzl et al. ........... 296/107.08
5,806,912 A * 9/1998 Ramaciotti et al. .... 296/107.09
2003/0011208 A1 * 1/2003 Tamura et al. ............... 296/108
2003/0080579 A1 * 5/2003 Reinsch .................. 296/107.17
2003/0085587 A1 * 5/2003 Reinsch .................. 296/107.17
2003/0197396 A1 * 10/2003 Eichholz et al. ............ 296/108

FOREIGN PATENT DOCUMENTS

| DE | 0 835 779 | 4/1998 |
| DE | 196 49 751 | 6/1998 |
| DE | 197 14 128 | 10/1998 |
| DE | 198 46 006 | 4/2000 |

* cited by examiner

Primary Examiner—D. Glenn Dayoan
Assistant Examiner—Patricia L. Engle
(74) Attorney, Agent, or Firm—Klaus J. Bach

(57) ABSTRACT

In a hardtop vehicle roof including rigid front intermediate and rear roof parts, which are movable between a closed position, in which the roof parts are arranged, in the longitudinal vehicle direction, one after the other so as to cover an interior of a vehicle body, and a storage position, in which the roof parts are disposed in a rear roof storage compartment which is provided with a compartment lid pivotally supported on the vehicle body, so that it can be raised for the transfer of the rigid roof parts between their closed positions and their positions in the roof storage compartment, the rear roof part is supported on the roof storage compartment lid, the intermediate roof part is supported directly on the vehicle body and the front part is supported on the intermediate roof part in such a way that in the storage compartment all the roof parts are disposed in the same orientation on top of one another.

8 Claims, 2 Drawing Sheets

HARDTOP VEHICLE ROOF WITH THREE RIGID ROOF PARTS

This is a Continuation-In-Part application of international application PCT/EP02/11208 filed Oct. 7, 2002 and claiming the priority of German application 101 49 456.4 filed Oct. 8, 2001.

BACKGROUND OF THE INVENTION

The invention relates to a hardtop vehicle roof with three rigid roof parts which are movable between a closed position in which they cover an interior vehicle space and an open position in which the roof parts are stored in a storage compartment, which can be closed by a storage compartment lid.

A vehicle roof consisting of three rigid roof parts is known for example from EP 0 835 779 A1. In a closed position, in which the roof parts cover an interior vehicle space, the roof parts are arranged one after another in the longitudinal vehicle direction. For opening the roof, the roof parts are lowered into a roof storage compartment which is disposed behind the vehicle interior and which can be closed by a storage compartment lid. The rear roof part is pivotally supported on the vehicle body by a respective partial roof operating mechanism, the intermediate roof part is hinged to the rear roof part and the front roof part is hinged to the intermediate roof part. During the transfer from the closed to the storage position, the rear roof part is pivoted back into the storage compartment. At the same time, the front roof part is pivoted between the intermediate and the rear roof part so that, in the storage compartment, the roof parts form a packet of the three roof parts in a position on top of one another wherein the rear and front roof parts are so arranged that their tops face downwardly whereas the top of the intermediate roof part faces upwardly.

This design however has the disadvantage that only the rear and the front roof part are deposited facing in the same direction whereas the intermediate roof part is oppositely oriented in the storage position, whereby the storage volume for the roof parts in the storage compartment is relatively large in vertical direction. The dished areas of rear and the front roof parts extend downwardly whereby the storage area for luggage under the vehicle roof packet is severely limited.

DE 198 46 006 A1 discloses a hardtop vehicle roof with three interconnected roof parts of which the rear roof part forms at the same time a coupe-like rear lid. This vehicle roof provides for a disadvantageous weight distribution, since the individual roof parts are interconnected in a kinematic chain and only the coupe-like rear lid is supported on the vehicle body. Because of this arrangement, the weight to be supported by the rear roof parts and the operating mechanisms is relatively large so that the respective roof parts and especially the operating mechanism must be designed for the accommodation of large forces and angular moments.

It is the object of the present invention to provide a hardtop vehicle roof, which has a relatively small storage volume when disposed in the storage compartment. The relatively small storage volume is to be achieved by relatively simple means.

SUMMARY OF THE INVENTION

In a hardtop vehicle roof including rigid front intermediate and rear roof parts, which are movable between a closed position, in which the roof parts are arranged, in the longitudinal vehicle direction, one after the other so as to cover an interior of a vehicle body, and a storage position, in which the roof parts are disposed in a rear roof storage compartment which is provided with a compartment lid pivotally supported on the vehicle body, so that it can be raised for the transfer of the rigid roof parts between their closed positions and their positions in the roof storage compartment, the rear roof part is supported on the roof storage compartment lid, the intermediate roof part is supported directly on the vehicle body and the front part is supported on the intermediate roof part in such a way that in the storage compartment all the roof parts are disposed in the same orientation on top of one another.

With the rear roof part of the hardtop vehicle roof supported on the storage compartment lid, the operating mechanism of the storage compartment lid or, respectively, the trunk lid—if this is the same as the storage compartment lid—can be used for the raising of the rear roof part whereby a sufficiently large opening for the transfer of the front roof parts is provided. Also, the rear roof part does not need to be connected separately to the vehicle body.

The roof part disposed immediately ahead of the rear roof part—which, for a three-part hardtop vehicle roof is the intermediate roof part—is expediently supported directly on the vehicle body and can be moved independently of the rear roof part between the closed and the storage positions without restriction of movement.

This arrangement permits the deposition of the rear roof part and the part ahead thereof, that is, the intermediate roof part, in the storage compartment in the same orientation, particularly, in such a way that the outer roof surfaces face upwardly so that each roof part has in the storage position the same orientation as in the closed position. Since the dished areas of the roof parts, then extend upwardly, the packet volume is in the storage position relatively small and, in comparison with the state of the art, a significantly larger storage space remains available in the trunk for the storage of luggage.

A further advantage of the arrangement is that the rear window panel and the C-columns which are generally part of the rear roof part can remain rigidly interconnected whereby the rear roof part has a high strength and rigidity. Because of the advantageous storage position, there is no need for a pivot movement of the rear window panel relative to the C-columns for improving the storage volume whereby there is also no need for respective separate operating mechanisms for the rear window panel and the C-columns.

In an expedient embodiment of the invention, the rear roof part is supported on the storage compartment lid by an associated partial roof operating mechanism in such a way that it can perform a pivot or transfer movement relative to the compartment lid. In this way, the vehicle roof can assume a Targa configuration, in which the rear roof part remains in its closed position relative to the storage compartment lid, as well as a cabriolet position, in which the rear roof part is disposed in the storage compartment below the storage compartment lid. In the cabriolet configuration, the rear roof part is disposed in the storage compartment expediently in the same orientation relative to the storage compartment lid as in the closed position thereof which can be achieved for example by a four-link operating mechanism.

With a three-part hardtop vehicle roof, the front roof part and the intermediate roof part are expediently interconnected and the intermediate roof part is movably supported on the vehicle body by an associated operating mechanism. In the storage position, all three roof parts are disposed in the storage compartment advantageously in the same orientation. For moving the vehicle roof into the storage compartment first the storage compartment lid including the rear roof part supported thereon are first pivoted open in order to provide a sufficiently large passage for the intermediate and the front roof parts, which are then moved through that passage into the storage compartment. Then the rear roof part is transferred into a position below the storage compartment lid and the storage compartment lid is again closed. The vehicle roof is now completely deposited in the storage compartment.

In an alternative embodiment, it may be expedient to transfer the rear roof part into a position below the storage compartment lid already at the beginning of the opening movement of the storage compartment lid in order to reduce the maximum height of the compound arrangement of storage compartment lid and rear roof part in the raised position of the storage compartment lid.

In the Targa position, the rear roof part remains in its closed position relative to the storage compartment lid or is returned to that position upon closing of the storage compartment lid. In this case, only the front and intermediate roof parts are deposited in the storage compartment.

In a preferred embodiment, the operating mechanism between the rear roof part and the storage compartment lid as well as the operating mechanism between the intermediate roof part and the vehicle body and also between the front and intermediate roof parts are four link operating mechanisms. Such four-link operating mechanisms are simple in design, have a high stability and reliability and are easy to operate.

Particular advantages and suitable embodiments of the invention will become apparent from the following description of the invention on the basis of the accompanying drawings.

DESCRIPTION OF A PARTICULAR EMBODIMENT

Figure 1:
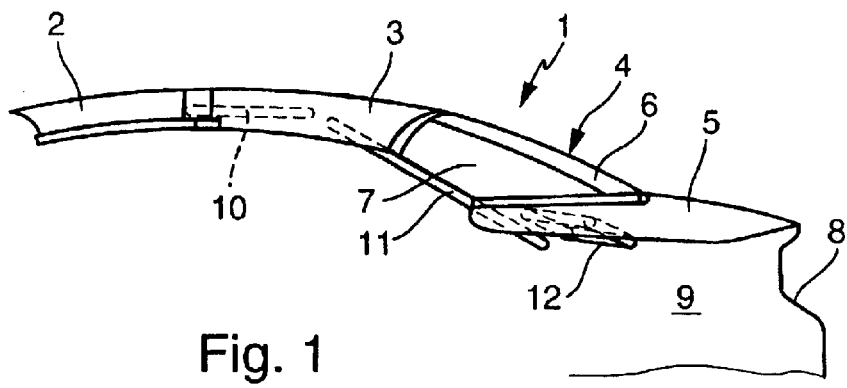
FIG. 1 shows a three-part hardtop vehicle roof with a front, an intermediate and a rear roof part in a closed position, wherein the rear roof part is supported by a rear cover, which forms at the same time a vehicle top storage compartment lid, the intermediate roof part is directly linked to the vehicle body and the front roof part is kinematically coupled to the intermediate roof part.

In the following description, identical components are designated in the various figures by the same reference numerals.

As shown in FIG. 1, the hardtop vehicle roof 1 comprises three rigid roof parts, that is, a front roof part 2, an intermediate roof part 3 and a rear roof part 4, which, in the closed position of the vehicle roof as shown in FIG. 1, are arranged in the longitudinal vehicle direction one after the other so as to form a continuous roof area for an interior vehicle space. The rear roof part 4 includes a rear window panel 6 and side C-columns 7, which are firmly connected to, or integral with, the rear window panel 6.

In the rear behind the interior vehicle space, the vehicle includes a roof top storage compartment lid 5, which is pivotally supported on the vehicle body 8 and, in the closed position as shown in FIG. 1, covers a storage compartment 9, which may be part of the vehicle trunk. The storage compartment cover or lid 5 is expediently also the trunk lid of the vehicle. By a lid operating mechanism the roof storage compartment lid 5 is pivotable into a raised position, whereby a passageway is provided for the transfer of the vehicle roof into the storage compartment 9. To this end, the top storage compartment lid 5 is pivoted about a rear pivot axis whereby the front part thereof adjacent the vehicle roof is raised.

Each vehicle roof part is provided with an operating mechanism. The front roof part 2 is connected to the intermediate roof part 3 by an operating mechanism 10 and can be moved from the closed position as shown in FIG. 1, in which all the roof parts are arranged one disposed after another, to a downwardly displaced position, in which the front roof part 2 is disposed immediately below the intermediate roof part 3 and oriented in the same way. The intermediate roof part 4 is supported directly on the vehicle body by the partial roof operating mechanism 11. The rear roof part 4 is supported on the storage compartment lid 5 by the partial roof operating mechanism 12.

Figure 2:
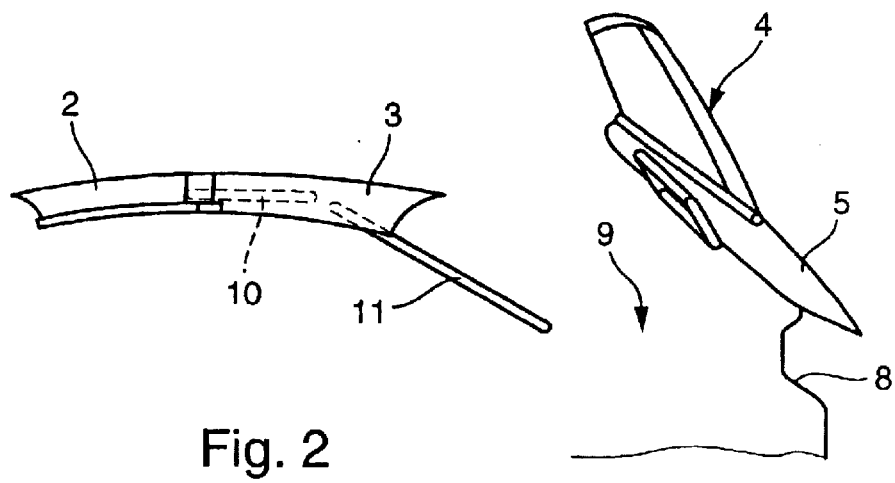
FIG. 2 shows the vehicle roof position at the beginning of the opening movement of the roof with the rear storage compartment lid raised.

FIG. 2 shows the vehicle roof at the beginning of the transfer of the vehicle roof from the closed position to the storage position. The storage compartment lid 5 is pivoted to an open position, in which it provides for a passageway for the transfer of the roof parts into the storage compartment 5. The rear roof 4 remains in its closed position relative to the storage compartment lid 5.

Figure 3:
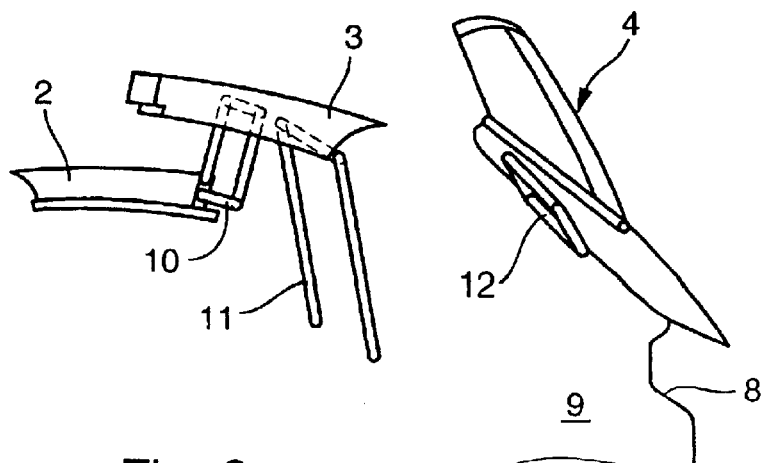
FIG. 3 shows the vehicle roof at the beginning of the opening movement of the front and intermediate roof parts.

FIG. 3 shows the front and intermediate roof parts 2 and 3 at the beginning of their movement to the storage compartment 9. The partial operating mechanisms 10 and 11 for operating the roof parts 2 and 3, respectively, comprise each a four-link kinematic operating mechanism. Expediently, also the partial kinematic operating mechanism 12 for the rear roof part 4 is a four-link mechanism. The four-link mechanisms make it possible to deposit the roof parts in the storage compartment in the same orientation, which they have in the closed position. As shown in FIG. 3, after the opening of the storage compartment lid 5 at the beginning of the roof storing procedure the front roof part 2 is pivoted into a parallel position below the intermediate roof part 3. At the same time, the intermediate roof part 3 is moved by the partial roof operating mechanism 11 toward its storage position.

Figure 4:
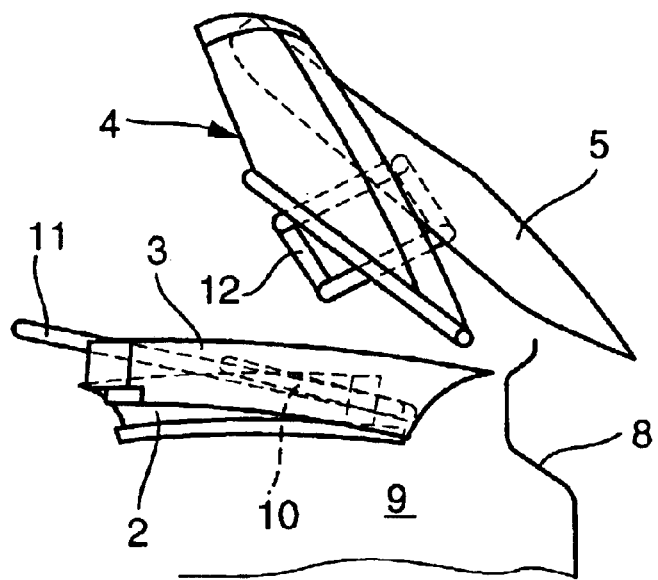
FIG. 4 shows the rear roof part lowered below the storage compartment lid.
Figure 5:
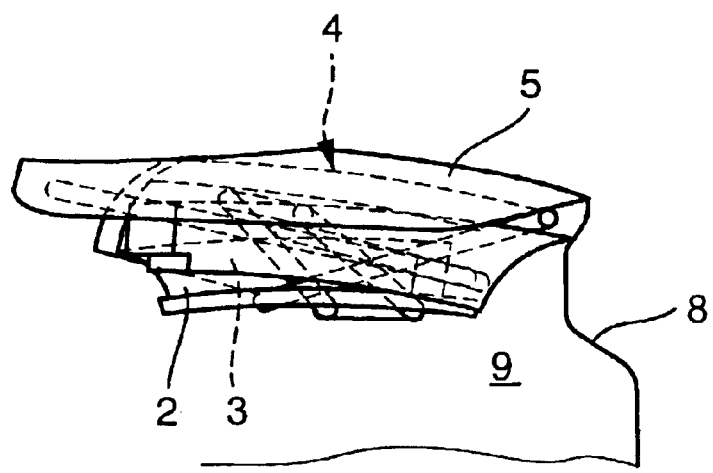
FIG. 5 shows the vehicle roof transferred into the storage compartment.

In FIG. 4, the front roof part 2 and the intermediate roof part 3 are shown in their storage position in the storage compartment 9. The rear roof part 4 is moved by the partial roof operating mechanism 12 into a position below the storage compartment lid 5. The storage compartment lid 5 is closed. The vehicle roof is now in the storage position as shown in FIG. 5, in which the roof packet is disposed in the storage compartment 9 with the front roof part 2 at the bottom and the intermediate roof part 3 and the rear roof part 4 above the front roof part 2.

The storage compartment lid 5 may be the trunk or back lid of the vehicle and, in that case, may also be opened from the back end of the vehicle in order to facilitate the loading of luggage into the trunk.

What is claimed is:

1. A hardtop vehicle roof with three rigid parts which are movable between a closed position, in which the roof parts are arranged, in the longitudinal vehicle direction, one after the other to cover an interior vehicle space and a storage position, in which the roof parts are deposited in a rear roof storage compartment, said vehicle including a body, a roof storage compartment lid pivotally supported on said vehicle body so as to cover said roof storage compartment but being pivotable to a raised position in which access is provided for transferring the rigid roof parts between their closed positions and their storage positions in the roof storage compartment, said rigid roof parts including a rear roof part, an intermediate roof part and a front roof part, said rear roof part being supported on said roof storage compartment lid, said intermediate roof part being supported directly on said vehicle body and said front roof part being supported on said intermediate roof part in such a way that, in said storage compartment, all the roof parts are disposed in the same orientation on top of one another.

2. A hardtop vehicle roof according to claim 1, wherein said rear roof part is supported on said roof storage compartment lid by a partial roof operating mechanism, which permits movement of the rear roof part relative to the storage compartment lid during transfer from the closed to the storage position thereof.

3. A hardtop vehicle roof according to claim 2, wherein, for movement into the storage compartment, the rear roof part is disposed below the roof storage compartment lid with its top surface being disposed on top adjacent the roof storage compartment lid.

4. A hardtop vehicle roof according to claim 2, wherein said rear roof part is pivotally supported on said roof storage compartment lid.

5. A hardtop vehicle roof according to claim 4, wherein said partial roof operating mechanism supporting said rear roof part on said roof storage compartment lid is a four-link kinematic operating mechanism.

6. A hardtop vehicle roof according to claim 1, wherein said intermediate roof parts is supported on said vehicle body by a four-link kinematic operating mechanism.

7. A hardtop vehicle roof according to claim 1, wherein said front roof part is supported on said intermediate roof part by a four-link kinematic operating mechanism.

8. A hardtop vehicle roof according to claim 1, wherein said roof storage compartment lid is at the same time the vehicle trunk lid.

* * * * *